(12) United States Patent
Kato et al.

(10) Patent No.: US 6,672,442 B2
(45) Date of Patent: Jan. 6, 2004

(54) ACTUATOR WITH CLUTCH MECHANISM

(75) Inventors: Yukiyasu Kato, Shizuoka-ken (JP); Masahiko Komoda, Aichi-ken (JP)

(73) Assignee: ASMO Co., Ltd., Kosai (JP)

( * ) Notice: Subject to any disclaimer, the term of this patent is extended or adjusted under 35 U.S.C. 154(b) by 0 days.

(21) Appl. No.: 10/184,433

(22) Filed: Jun. 28, 2002

(65) Prior Publication Data

US 2003/0006112 A1 Jan. 9, 2003

(30) Foreign Application Priority Data

Jul. 3, 2001 (JP) ........................................ 2001-201679

(51) Int. Cl.[7] .............................................. F16D 41/02
(52) U.S. Cl. .......................................... 192/38; 192/44
(58) Field of Search ............................. 192/38, 45, 44, 192/47, 54.52; 49/149, 32; 310/78

(56) References Cited

U.S. PATENT DOCUMENTS

| | | | | |
|---|---|---|---|---|
| 4,222,472 A | * | 9/1980 | Telford | 192/38 |
| 4,881,018 A | * | 11/1989 | Kato et al. | 49/139 |
| 5,052,990 A | * | 10/1991 | Sakakibara et al. | 475/210 |
| 5,103,950 A | * | 4/1992 | Ito et al. | 192/44 |
| 5,348,126 A | * | 9/1994 | Gao | 192/44 |
| 5,549,187 A | * | 8/1996 | Kofler | 192/38 |
| 5,638,158 A | * | 6/1997 | Sanpe et al. | 399/174 |
| 6,155,395 A | * | 12/2000 | Braford, Jr. | 192/48.3 |
| 6,588,559 B2 | * | 7/2003 | Blair | 192/38 |

FOREIGN PATENT DOCUMENTS

JP 06-328940 11/1994

* cited by examiner

*Primary Examiner*—Rodney H. Bonck
(74) *Attorney, Agent, or Firm*—Colin P. Cahoon; Carstens, Yee & Cahoon, LLP

(57) ABSTRACT

A clutch mechanism is provided between a driving rotor and a driven rotor. The clutch mechanism selects from a state for transmitting rotational force and a state for discontinuing the transmission of rotational force. The holder permits the rolling. A holder supports rolling bodies such that the rolling bodies are switched between a transmitting position and a disconnecting position. When held at the transmitting position, the rolling bodies are engaged with both of the driving rotor and the driven rotor so that rotational force of the driving rotor is transmitted to the driven rotor. When held at the disconnecting position, the rolling bodies are disengaged from the driving rotor so that the transmission of rotational force from the driven rotor to the driving rotor is discontinued. When external rotational force is applied to the driven rotor, the holder sets the rolling bodies to the disconnecting position.

15 Claims, 5 Drawing Sheets

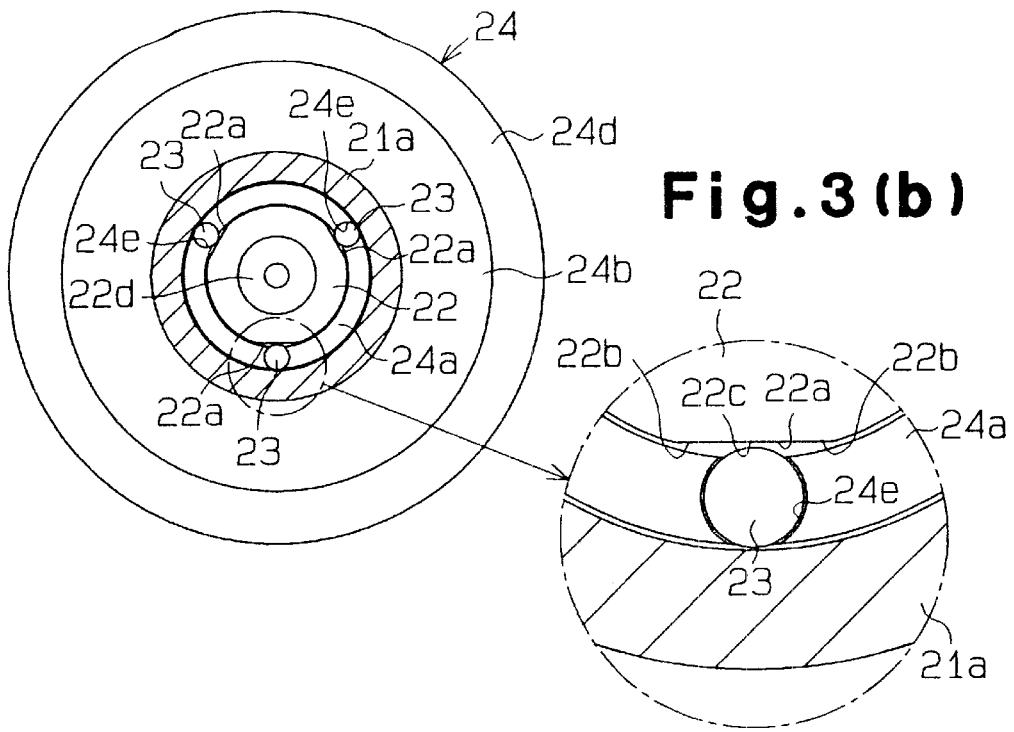
Fig.3(a)
Fig.3(b)
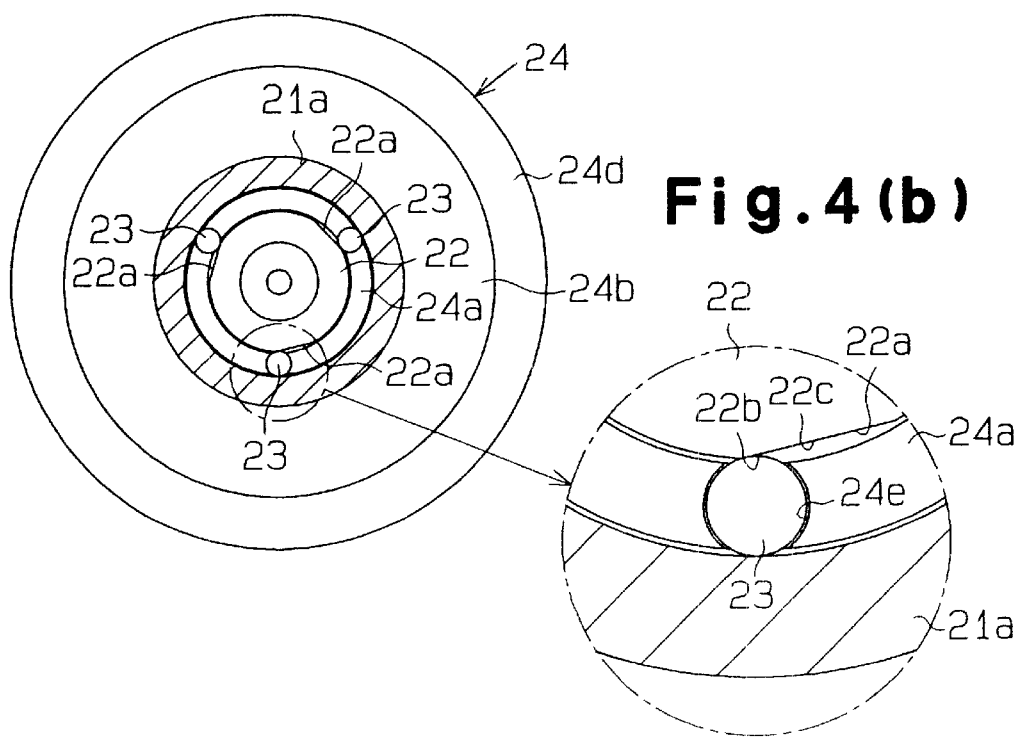
Fig.4(a)
Fig.4(b)

ACTUATOR WITH CLUTCH MECHANISM

BACKGROUND OF THE INVENTION

The present invention relates to an actuator with clutch mechanism, more particularly, to an actuator that is used in a power-assisted vehicle door and in a drum rotating mechanism of a photocopier.

Some vehicles have power-assisted doors with actuators. The actuator applies assisting force to a vehicle door when a user opens or closes the door. For example, Japanese Laid-Open Patent Publication No. 6-328940 discloses such a power-assisted door. The apparatus of the publication includes an actuator located in the panel of a door. The actuator has an electric motor as a drive source. The motor has a gear fixed to the rotary shaft. The gear is coupled to a worm gear via a reduction gear. The worm gear is coupled to a slider. The slider is coupled to the vehicle body with an assisting force applying member and brackets. Rotation of the motor is converted into reciprocation of the slider by the worm gear. The reciprocation of the slider is, in turn, converted into opening and closing motion of the door. When predetermined conditions are satisfied, for example, when an operation switch is turned on, the force of the actuator (assisting force) permits the door to be opened or closed with a small force applied by the user.

The number of gears and the lead angle of the worm gear are determined such that the rotary shaft of the motor is rotated by force applied by the door. Therefore, when the predetermined conditions are not satisfied, or when the actuator is not working, the door can be opened and closed manually. However, when the door is opened or closed manually, the worm gear is rotated by the force applied from the door. In other words, the force is applied to the output side of the apparatus. Thus, a great force is required for opening and closing the door manually.

An electromagnetic clutch may be used for transmitting rotational force from the worm gear (driving member) to the gear of the door (driven member) and for prohibiting the worm gear from receiving rotational force from the gear of the door. If the electromagnetic clutch does not transmit rotational force from the gear of the door to the worm gear when the door is opened or closed manually, the worm gear does not receive any load. This permits the door to be opened and closed with a small force. However, the electromagnetic clutch increases the size of the apparatus and increases the cost.

SUMMARY OF THE INVENTION

Accordingly, it is an objective of the present invention to provide a clutch mechanism, an actuator with clutch mechanism, and a power-assisted door using the actuator that mechanically transmit force from a driving member to a driven member, permits the driven member to rotate without applying load to the driving member, and reduces the size and the costs.

To achieve the foregoing and other objectives and in accordance with the purpose of the present invention, a clutch mechanism is provided between a driving rotor and a driven rotor. The clutch mechanism selects from a state for transmitting rotational force of the driving rotor to the driven rotor and a state for discontinuing the transmission of rotational force generated from the driven rotor to the driving rotor. The clutch mechanism includes a plurality of rolling bodies and a holder. The rolling bodies are located between the driving rotor and the driven rotor. The holder holds the rolling bodies and permits the rolling bodies to roll. The holder supports the rolling bodies such that the rolling bodies are switched between a transmitting position and a disconnecting position. When held at the transmitting position, the rolling bodies are engaged with both of the driving rotor and the driven rotor so that rotational force of the driving rotor is transmitted to the driven rotor. When held at the disconnecting position, the rolling bodies are disengaged from the driving rotor so that the transmission of rotational force from the driving rotor to the driven rotor is discontinued. When external rotational force is applied to the driven rotor, the holder sets the rolling bodies to the disconnecting position.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*a*) is a schematic view showing the operation of the clutch mechanism of FIG. 1;

FIG. 3(*b*) is an enlarged view of FIG. 3(*a*);

FIG. 4(*a*) is a schematic view showing the operation of the clutch mechanism of FIG. 1;

FIG. 4(*b*) is an enlarged view of FIG. 4(*a*);

FIG. 5(*b*) is an enlarged cross-sectional view illustrating the rotation device of FIG. 5(*a*);

FIG. 6(*b*) is an enlarged view of FIG. 6(*a*);

FIG. 7(*b*) is an enlarged view of FIG. 7(*a*).

DETAILED DESCRIPTION OF THE PREFERRED EMBODIMENTS

An actuator 1 used in a power-assisted vehicle door according a first embodiment of the present invention will now be described with reference to FIGS. 1 to 4(*b*).

Figure 1:
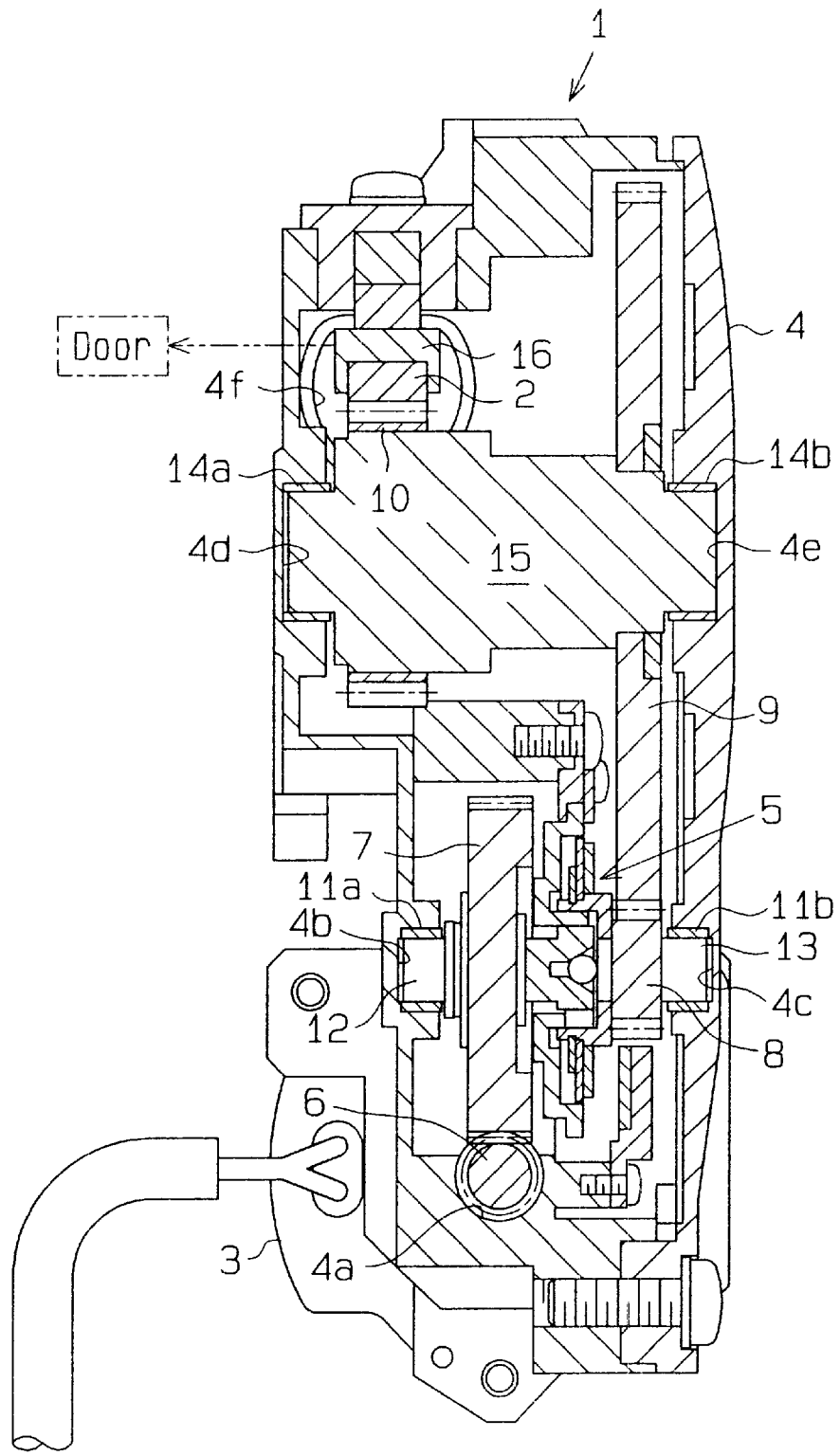
FIG. 1 is a cross-sectional view illustrating an actuator according to a first embodiment of the present invention.

The actuator 1 is located in the door. The cross-sectional view of FIG. 1 is a view taken perpendicular to the extending direction of the actuator 1. The actuator 1 includes a rack 2, which moves linearly along the extending direction of the actuator 1. The distal end of the rack 2 is coupled to the vehicle body at a part displaced from the axis of the hinge by which the door is supported. That is, the actuator 1 moves the rack 2 linearly to apply assisting force to the door when the door is opened or closed.

The actuator 1 includes a direct-current motor 3, a gear housing 4, and a clutch mechanism 5. The direct-current motor 3 is cylindrical and extends along the extending direction of the actuator 1. The motor 3 has a worm 6 protruding from one side. The motor 3 is fixed to the gear housing 4 with the worm 6 accommodated in a worm container 4a of the gear housing 4. The worm 6 rotates integrally with the rotary shaft (not shown) of the motor 3 when the motor 3 is running. The motor 3 is connected to a controller (not shown).

The gear housing 4 accommodates the worm 6, a driving rotor, a clutch mechanism 5, a driven rotor, a large diameter gear 9, and a pinion 10. In this embodiment, the driving rotor is a worm wheel 7, and the driven rotor is a small diameter gear 8. The gear housing 4 also accommodates a part of the rack 2.

Specifically, a pair of first shaft receptacles 4b, 4c is formed in the gear housing 4. The shaft receptacles 4b, 4c are located in the vicinity of the worm container 4a and are arranged in the direction of the thickness of the gear housing 4 (lateral direction as viewed in FIG. 2). The shaft receptacles 4b, 4c face each other. Slide bearings 11a, 11b are fixed to the shaft receptacles 4b, 4c, respectively.

The worm wheel 7, the clutch mechanism 5, and the small diameter gear 8 are arranged in this order and coupled to one another. A first supporting shaft 12 extends from the worm wheel 7 (from the left side of the worm wheel 7 as viewed in FIG. 2). The first supporting shaft 12 is supported by the slide bearing 11a. A second supporting shaft 13 extends from a side of the small diameter gear 8 (from the right side as viewed in FIG. 2). The second supporting shaft 13 is supported by the slide bearing 11b. The worm wheel 7, the clutch mechanism 5, and the small diameter gear 8 are held in the gear housing 4. The worm wheel 7 is engaged with the worm 6.

Second shaft receptacles 4d, 4e are formed in the gear housing 4. The second shaft receptacles 4d, 4e are displaced from the first shaft receptacles 4b, 4c and are arranged in the direction of thickness of the gear housing 4 (in the lateral direction as viewed in FIG. 1). The second shaft receptacles 4d, 4e face each other. Slide bearings 14a, 14b are fixed to the shaft receptacles 4d, 4e, respectively.

The large diameter gear 9 and pinion 10 are fixed to the supporting shaft 15. One end of the supporting shaft 15 (left end as viewed in FIG. 1, or the end closer to the pinion 10), is supported by the slide bearing 14a. The other end of the supporting shaft 15 (right end as viewed in FIG. 1, or the end close to the large diameter gear 9) is supported by the slide bearing 14b. The large diameter gear 9 and the pinion 10 are supported by the gear housing 4 and rotate integrally. The large diameter gear 9 is engaged with the small diameter gear 8.

A rail 16 is located in the gear housing 4. The rail 16 extends along the extending direction of the actuator 1. The rail 16 is fixed to a part in the vicinity of the pinion 10 and is parallel to the worm 6. A through hole 4f is formed in the gear housing 4 to communicate the interior of the gear housing 4 with the exterior. The through hole 4f is aligned with the rail 16.

The rack 2 is supported by the rail 16 to move linearly along the rail 16 such that the distal end protrudes from the through hole 4f. The rack 2 is engaged with the pinion 10. The distal end of the rack 2 is coupled to the vehicle body as described above.

The clutch mechanism 5 will now be described with reference to FIGS. 2, 3(a), 3(b), 4(a), and 4(b). The clutch mechanism 5 transmits rotational force of the worm wheel 7 to the small diameter gear 8. However, the clutch mechanism 5 permits the small diameter gear 8 to rotate without transmitting rotational force of the small diameter gear 8 to the worm wheel 7.

The clutch mechanism 5 includes a collar 21, a clutch shaft 22, three rolling bodies, a rotation limiting member, and three retainers. In this embodiment, the rolling bodies are rollers 23, the rotation limiting member is a wheel-shaped roller holder 24, and the retainers are calipers 25.

The collar 21 includes a substantially cylindrical portion 21a and a disk portion 21b. The disk portion 21b extends radially inward from an end of the cylindrical portion 21a. The collar 21 is fitted to a protruding portion 8a protruding from one end of the small diameter gear 8 (the left end as viewed in FIG. 2) to rotate integrally with the small diameter gear 8. A sensor magnet M is fixed to the circumferential surface of the cylindrical portion 21a of the collar 21. The sensor magnet M faces a sensor substrate S, which is fixed to the gear housing 4.

As shown in FIG. 3(a), the outer diameter of the distal end of the clutch shaft 22 (the right end as viewed in FIG. 2) is smaller than the inner diameter of the cylindrical portion 21a. Three cut-off surfaces 22a are formed in the circumference of the clutch shaft 22. In this embodiment, the cut-off surfaces 22a are formed by linearly cutting parts of the circumference of the clutch shaft 22. The three cut-off surfaces 22a are arranged in equal angular intervals. The proximal end (the left end as viewed in FIG. 2) of the clutch shaft 22 is fixed to the worm wheel 7 to rotate integrally with the worm wheel 7. The distal end of the clutch shaft 22 is located inside the cylindrical portion 21a. The distance between each cut-off surface 22a and the inner surface of the cylindrical portion 21a varies in the circumferential direction. Specifically, the distance between each cut-off surface 22a and the inner surface of the cylindrical portion 21a is shorter in the side sections 22b of the cut-off surface 22a (see FIG. 3(b)) and is longer in the center section 22c of the cut-off surface 22a.

Figure 2:
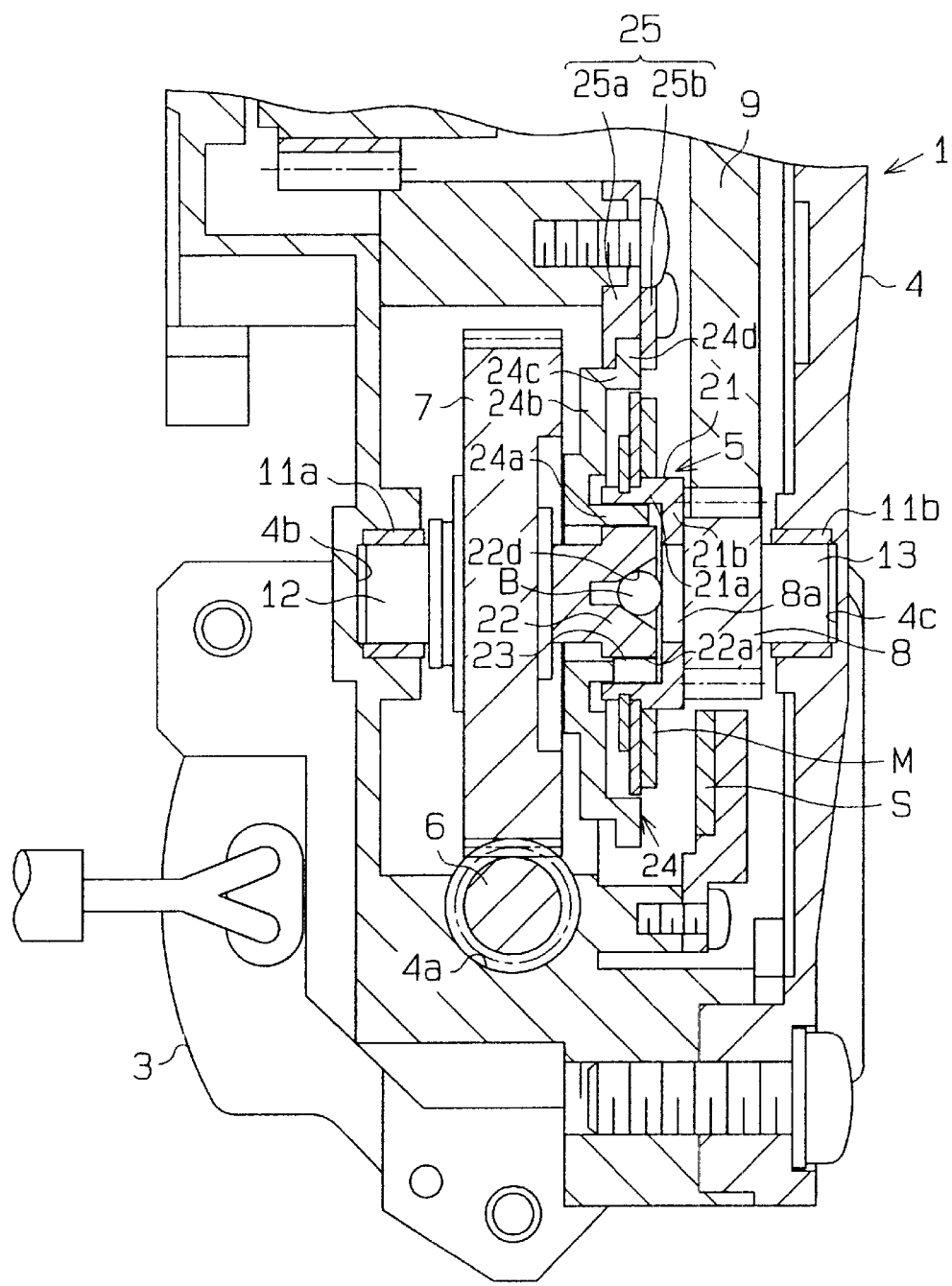
FIG. 2 is an enlarged cross-sectional view illustrating the actuator of FIG. 1.

A holding recess 22d is formed in the center of the distal end of the clutch shaft 22 (the right end as viewed in FIG. 2). A ball B is received by the holding recess 22d. The ball B partly projects from the holding recess 22d and contacts the protruding portion 8a of the small diameter gear 8. This permits the small diameter gear 8 to smoothly rotate relative to the clutch shaft 22.

Each roller 23 is cylindrical and the diameter is shorter than the distance between the inner surface of the cylindrical portion 21a and the center section 22c of each cut-off surface 22a as shown in FIGS. 3(a), 3(b), 4(a), and 4(b). The diameter of each roller 23 is longer than the distance between the inner surface of the cylindrical portion 21a and the side sections 22b of each cut-off surface 22a. Each roller 23 is located between one of the cut-off surfaces 22a and the inner surface of the cylindrical portion 21a.

The roller holder 24 includes a substantially cylindrical portion 24a, a disk portion 24b, and a large diameter portion 24c, and an engaging portion. The disk portion 24b extends radially outward from one end of the cylindrical portion 24a (the left end as viewed in FIG. 2). The large diameter portion 24c extends axially toward the other end of the cylindrical portion 24a (rightward as viewed in FIG. 2). In this embodiment, the engaging portion is an annular portion 24d, which extends radially outward from the large diameter portion 24c.

The outer diameter of the cylindrical portion 24a is slightly smaller than the inner diameter of the cylindrical portion 21a. The inner diameter of the cylindrical portion 24a is slightly larger than the outer diameter of the distal end of the clutch shaft 22. The thickness of the cylindrical portion 24a is smaller than the diameter of each roller 23 (see FIG. 3(b)). Three receptacles 24e are formed in the other end of the cylindrical portion 24a. The receptacles 24e receive and hold the rollers 23 and are arranged in equal angular intervals. Each receptacle 24e has a pair of arcuate inner walls in the circumferential direction of the cylindrical portion 24a. The radius of curvature of the arcuate inner walls in each receptacle 24e is slightly greater than the radius of the rollers 23. Each receptacle 24e holds one of the rollers 23 and permits the roller 23 to slightly move in the axial direction. The distances among the three rollers 23 are constant. The roller holder 24 is arranged such that the cylindrical portion 24a is inserted into the cylindrical portion 21a, and the annular portion 24d is located outside of the cylindrical portion 21a and extends radially outward.

As shown in FIG. 2, each caliper 25 is screwed to the gear housing 4 and has a first and a second holding member. In this embodiment, the first and second holding members are first and second shoes 25a, 25b. The calipers 25 are arranged about the roller holder 24 at equal angular intervals. Only one of the supporting members 25 is shown in FIG. 2. Each caliper 25 holds the annular portion 24d with the shoes 25a, 25b by applying a predetermined pressure. That is, each caliper 25 holds the annular portion 24d with a predetermined force and permits the annular portion 24d to rotate when a force greater than a predetermined value is applied. The predetermined value is significantly smaller than the rotational force of the worm wheel 7 generated by the direct-current motor 3.

When predetermined conditions are satisfied, for example, when a switch in the vicinity of the door is turned on or when external force applied to the door (manipulating force) is equal to or greater than a predetermined level, the controller (not shown) of the power-assisted door supplies direct current to the direct-current motor 3, thereby rotating the worm 6.

After rotating the worm 6 with the motor 3, the controller supplies direct current to the motor 3 to rotate the worm 6 in the opposite direction by a predetermined amount, thereby reversing the rotation of the worm 6 by a predetermined amount.

The operation of the actuator 1 will now be described.

When predetermined conditions are satisfied, for example, when a user manipulates a switch in the vicinity of the door handle before opening or closing the door or when force applied to the door (manipulation force) is greater than a predetermined level, the controller supplies driving voltage to the direct-current motor 3.

Then, the worm 6 rotates with the rotary shaft of the motor 3. Accordingly, the worm wheel 7 and the clutch shaft 22 are rotated. At this time, the clutch shaft 22 is slightly rotated counterclockwise as shown in FIGS. 4(a) and 4(b), which moves each roller 23 to one of the side sections 22b of the corresponding cut-off surface 22a. The roller 23 is thus tightly held between the side section 22b and the cylindrical portion 21a. The rollers 23 are moved to transmitting positions. When the clutch shaft 22 is further rotated, each roller 23 receives force that further presses the roller 23 against the corresponding side section 22b, and the rotational force of the clutch shaft 22 is transmitted to the cylindrical portion 21a through the rollers 23, which rotates the collar 21 and the small diameter gear 8. The roller holder 24 is held by the caliper 25 with a predetermined force. However, since the rotational force of the worm wheel 7 generated by the direct-current motor 3 is significantly greater than the predetermined force, the roller holder 24 rotates integrally with the rollers 23.

Then, the large diameter gear 9 and the pinion 10 are rotated by rotation of the small diameter gear 8. Rotation of the pinion 10 is converted into linear motion of the rack 2. The rack 2, in turn, applies assisting force to the door in the opening or closing direction. In this manner, the power-assisted door uses the force of the actuator 1 (assisting force) to permit the door to be opened or closed with a small force.

The controller first rotates the worm 6 with the rotary shaft of the motor 3 and then provides the motor 3 with a direct current that rotates the motor in the opposite direction by a predetermined amount. Therefore, the worm 6 is rotated in the opposite direction for a predetermined amount. The amount by which the worm 6 is rotated in the opposite direction is determined such that each roller 23 is moved from the position in FIGS. 4(a), 4(b), or transmitting position, to the position in FIGS. 3(a), 3(b), or disconnecting position. In FIGS. 4(a), 4(b), each roller 23 is held between a side section 22b of the corresponding cut-off surface 22a and the cylindrical portion 21a. In FIGS. 3(a), 3(b), each roller 23 faces the center section 22c of the corresponding cut-off surface 22a. Therefore, after the motor 3 is actuated, each roller 23 is positioned at the disconnecting position shown in FIGS. 3(a), (b) and faces the center section 22c of the corresponding cut-off surface 22a.

If the predetermined conditions are not satisfied when the user opens or closes the door, for example, if the switch in the vicinity of the door is not manipulated or if the external force applied to the door is less than the predetermined level, the controller does not supply driving voltage to the direct-current motor 3.

If the user manually opens or closes the door in this state, the rack 2 is moved linearly, which, in turn, rotates the pinion 10 and the large diameter gear 9.

Rotation of the large diameter gear 9 rotates the small diameter gear 8 and the collar 21. Since the roller holder 24 is held by the calipers 25 with a predetermined force, each roller 23 is not moved to the side sections 22b, or in the direction to engage with the cut-off surface 22a even if the roller 23 slightly contacts the rotating cylindrical portion 21a (even if the roller 23 chatters and contacts the cylindrical portion 21a). Therefore, rotational force of the collar 21 is not transmitted to the clutch shaft 22, and the clutch shaft 22 does not receive load. In this manner, if the door is opened or closed manually when the predetermined conditions are not satisfied, the door can be opened or closed with a small force.

The characteristic advantages of the actuator 1 having the clutch mechanism 5 will now be discussed.

(1) The clutch mechanism 5 transmits rotational force from the worm wheel 7 to the small diameter gear 8. The clutch mechanism 5 also permits the small diameter gear 8 to rotate without transmitting rotational force from the small diameter gear 8 to the worm wheel 7. Therefore, compared to an actuator having an electromagnetic clutch, the actuator 1 reduces the size and the costs.

(2) The clutch shaft 22 has the three cut-off surfaces 22a, which are arranged at equal angular intervals. Each roller 23 corresponds one of the cut-off surfaces 22a. When the worm wheel 7 and the clutch shaft 22 are rotated, rotational force of the clutch shaft 22 is transmitted to the cylindrical portion 21a through three paths. The rotational force of the clutch shaft 22 is thus transmitted to the cylindrical portion 21a in a well-balanced manner, which improves durability of the members.

(3) The roller holder 24 has the annular portion 24d, which is held by the first and second shoes 25a, 25b of the caliper 25 by a predetermined pressure. Therefore, even if the roller holder 24 is rotated, the roller holder 24 is always held with a simple structure.

(4) After the rotary shaft of the motor 3 (the worm 6) is rotated, the direct-current motor 3 is rotated in the opposite direction so that each roller 23 is moved to a position corresponding to the center section 22c of the corresponding cut-off surface 22a. Thus, when the door is opened or closed manually and the small diameter gear 8 is rotated, the rollers 23 are prevented from being held between the sides 22b of the cut-off surfaces 22a and the cylindrical portion 21a.

A rotation device 31 for rotating a drum 32 of a photo-copier according to second embodiment of the present invention will now be described with reference to FIGS. 5(a) to 7(b).

The rotation device 31 includes the drum 32, a stator housing 33, a rotor housing 34, a standing-wave type (bolt-clamped Langevin type) ultrasonic motor 35, a clutch mechanism C, and a reduction mechanism 36.

The drum 32 is substantially cylindrical and rotatably supported in the casing of the photocopier (not shown). A tooth ring 37 is fixed to the inner surface of the drum 32.

The stator housing 33 is substantially cylindrical and has a distal thick portion 33a. The distal thick portion 33a is formed at the distal end of the stator housing 33 (top end as viewed in FIG. 5). The diameter of the distal thick portion 33a is larger than that of the rest of the stator housing 33. Five threaded holes 33b are formed in the distal thick portion 33a (only one is shown in FIG. 5). Each threaded hole 33b extends from the distal end toward the proximal end of the stator housing 33. An external projecting portion 33c is formed at the proximal portion (lower end as viewed in FIG. 5) of the stator housing 33. The external projecting portion 33c extends radially outward. A cylindrical portion 33d extends from the periphery of the projecting portion 33c. Threaded holes 33e are formed in the projecting portion 33c. The threaded holes 33e extend axially and are located close to the cylindrical portion 33d. The projecting portion 33c and the cylindrical portion 33d are coupled to the casing (not shown) of the photocopier such that the stator housing 33 is substantially accommodated in the drum 32.

The rotor housing 34 includes a cylindrical portion 34a, an outer portion 34b, and an annular inner projection 34c. The outer diameter of the cylindrical portion 34a is substantially equal to the inner diameter of the stator hosing 33. The outer portion 34b extends radially outward from the distal end (upper end as viewed in FIG. 5) of the cylindrical portion 34a. The inner projection 34c projects radially inward from the axial center of the cylindrical portion 34a. Through holes 34d are formed in the outer portion 34b. Each through hole 34d corresponds to one of the threaded holes 33b on the stator housing 33. A screw head receiving portion 34e is formed in the distal portion of each through hole 34d. The screw head receiving portion 34e has an enlarged inner diameter. Threaded holes 34f (only one is shown in FIG. 5) are formed in the outer portion 34b. The threaded holes 34f extend in the axial direction.

The rotor housing 34 is secured to the stator housing 33 by screws N1, which are received by the through holes 34d and threaded to the threaded holes 33b. The head of each screw N1 is received by the head receiving portion 34e.

Two ball bearings 38, 39 are fitted in the cylindrical portion 34a of the rotor housing 34. The ball bearing 38 is inserted from the side corresponding to the cylindrical member 34a such that the outer ring of the ball bearing 38 contacts the inner projection 34c. The ball bearing 39 is inserted from the side corresponding to the proximal end of the cylindrical portion 34a such that the outer ring of the ball bearing 39 contacts the inner projection 34c.

The ball bearings 38, 39 support a driving rotor, which is a motor rotary shaft 40. A disk 41 is fixed to the distal end of the motor rotary shaft 40 with a nut 42. A cylindrical column shaped rotor 43 is fixed to the proximal end of the motor rotary shaft 40. A disk spring 45 is located between the proximal surface of the disk 41 and the inner ring of the ball bearing 38 with a washer 44. A disk spring 47 is located between the distal surface of the rotor 43 and the inner ring of the ball bearing 39 with a washer 46. The disk springs 45, 47 are arranged in a compressed state. The motor rotary shaft 40, the disk 41, and the rotor 43 are supported to be axially movable in a predetermined range. The disk springs 45, 47 hold the motor rotary shaft 40, the disk 41, and the rotor 43 at the middle position in the predetermined range.

A stator 51 is fixed to the stator housing 33. The stator 51 and the rotor 43 form the ultrasonic motor 35.

The stator 51 includes an upper metal block 52, a lower metal block 53, first and second piezoelectric elements 54, 55, first to third electrode plates 56 to 58, a bolt 59, and an insulation collar 60.

The upper and lower metal blocks 52, 53 are made of conductive metal. In this embodiment, the metal blocks 52, 53 are made of aluminum alloy. The upper metal block 52 is substantially cylindrical. The inner diameter of the upper portion of the upper metal block 52 is enlarged to form a horn 52a. The horn 52a is used for vibrating the upper end surface of the upper metal block 52. A threaded hole is formed in the inner surface of the upper metal block 52 at a part except for the horn 52a. A thin film (not shown) of frictional material is formed on the upper end surface of the upper metal block 52.

The lower metal block 53 is substantially cylindrical and has the same inner and outer diameters as those of the upper metal block 52. An annular outer projection 53a is formed in the axial center of the lower metal block 53. Through holes 53b are formed in the peripheral portion of the outer projection 53a. Each through hole 53b corresponds to one of the threaded holes 33e of the stator housing 33. Slits (recesses) are formed in the circumference of the upper portion of the lower metal block 53 at a part above the outer projection 53a. The slits generate torsional vibration based on excited vertical vibration. The slits are inclined relative to the axial direction. A threaded hole is formed in the inner surface of the lower metal block 53.

The first and second piezoelectric elements 54, 55 are shaped like disks and have a through hole in the center.

The first to third electrode plates 56 to 58 are shaped like disks and have a through hole in the center.

The bolt 59 is shaped like a cylindrical column with the threaded circumference. The bolt 59 is threaded to the threaded holes of the upper and lower metal blocks 52, 53.

The insulation collar 60 is a cylinder made with electrical insulating material.

The lower metal block 53, the third electrode plate 58, the second piezoelectric element 55, the second electrode plate 57, the first piezoelectric element 54, the first electrode plate 56, and the upper metal block 52 are arranged in this order and secured to one another by the bolt 59 threaded to the threaded holes of the upper and lower metal blocks 52, 53. The first and second piezoelectric elements 54, 55 are arranged such that the polarization direction of the first piezoelectric element 54 is opposite to that of the second element 55. The insulation collar 60 is located between the outer surface of the bolt 59 and the first and second piezoelectric elements 54, 55, and between the bolt 59 and the first to third electrode plates 56 to 58.

The stator 51 is fixed to the stator housing 33 by screws N2. Specifically, each screw N2 is inserted into one of the through holes 53b of the lower metal block 53 and threaded with the corresponding threaded hole 33e of the stator housing 33. The upper end surface of the stator 51 urges the proximal surface of the rotor 43 toward the distal side. Since the rotor 43 is held at the predetermined position by the disk springs 45, 47, the rotor 43 is pressed against the upper end surface of the stator 51. The first to third electrode plates 56 to 58 are electrically connected to a controller (not shown) located outside of the stator housing 33 by conducting wires (not shown).

The reduction mechanism 36 is coupled to the motor rotary shaft 40 via the clutch mechanism C. The reduction mechanism 36 is a planetary gear train and includes the tooth ring 37 fixed to the drum 32, first and second supporting members 61, 62, coupler pins 63, a driven rotor, and planetary gears 65. In this embodiment, the driven rotor is a sun gear shaft 64.

The first supporting member 61 includes an annular portion 61a, a thin portion 61b axially extending from the inner periphery of the annular portion 61a, a thick portion 61c extending axially from the distal end of the thin portion 61b. The thick portion 61c is thick so that the inner diameter is less than that of the thin portion 61b. Axially extending through holes 61d are formed in the annular portion 61a. Each through hole 61d corresponds one of the threaded portions 34f of the rotor housing. Two recesses 61e are formed in the inner surface of the thick portion 61c. The recesses 61e extend axially from the distal end toward the proximal end and are spaced apart by one hundred eighty degrees. A substantially cylindrical engaging member 61f is fitted to the recesses 61e in the axial direction. At the proximal end of the engaging member 61f (the lower end as viewed in FIG. 5(b)), a holding recess 61g is formed in the axial center of the first supporting member 61 (see FIG. 5(b)). In this embodiment, the engaging members 61f, in which the holding recesses 61g are formed, and the first supporting member 61 form retainers and holding members, which are part of the clutch mechanism C.

The first supporting member 61 is fixed to the rotor housing 34 by screws N3, which are inserted into the through holes 61d and threaded to the threaded holes 34f. The inner surface of the drum 32 is coupled to the outer surface of the thick portion 61c by the ball bearing 66. That is, the thick portion 61c rotatably supports part of the drum 32, more specifically, part that is between the tooth ring 37 and the axially proximal end (middle and lower sections as viewed in FIG. 5(a)), with the ball bearing 66.

The second supporting member 62 is substantially cylindrical. Two pin receptacles 62a are formed in the proximal portion of the second supporting member 62. The pin receptacles 62a extend from the proximal end toward the distal end and are spaced apart by one hundred eighty degrees.

The second supporting member 62 is fixed to the engaging member 61f of the first supporting member 61 with coupler pins 63. Specifically, one end of each coupler pin 63 is fitted into the center hole of the corresponding engaging member 61f, to which the first supporting member 61 is engaged. The other end of the coupler pin 63 is engaged with the corresponding pin receptacle 62a of the second supporting member 62. Accordingly, the first and second supporting members 61, 62 are coupled to each other. The inner surface of the drum 32 is coupled to the outer surface of the second supporting member 62 with the ball bearing 67.

Figure 5A:
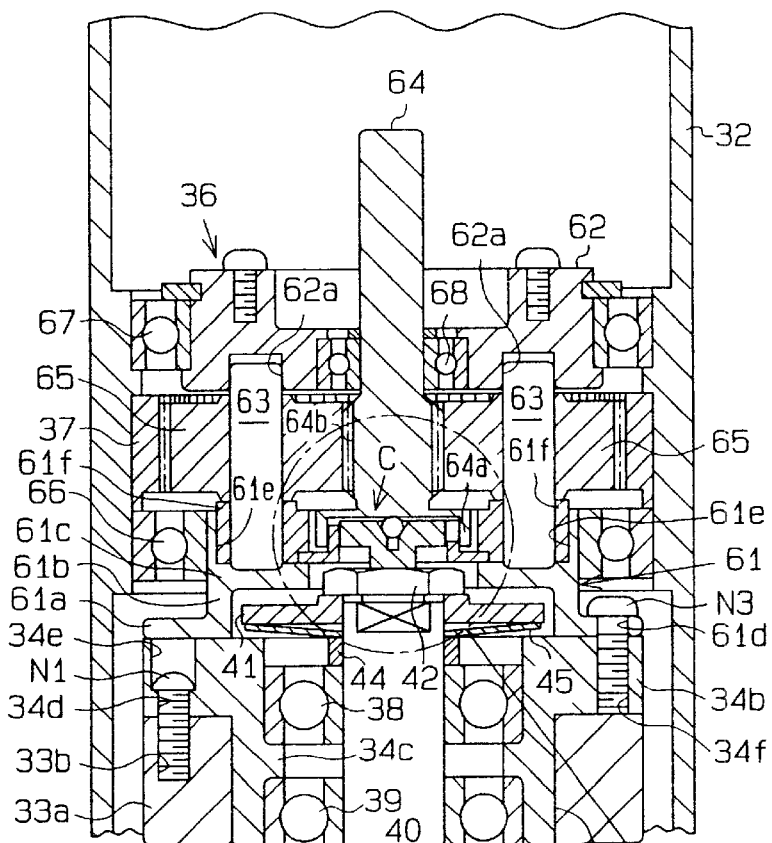
FIG. 5(*a*) is a cross-sectional view illustrating a rotation device according to a second embodiment of the present invention.

That is, the second supporting member 62 rotatably supports part of the drum 32, more specifically, part between the tooth ring 37 and the distal end (the middle and upper sections as viewed in FIG. 5(a)), with the ball bearing 67. The ball bearing 68 is fixed to the inner surface of the second supporting member 62. The sun gear shaft 64 is rotatably supported by the ball bearing 68. At the proximal end of the sun gear shaft 64 (the lower end as viewed in FIG. 5), a substantially cylindrical collar 64a is formed (see FIG. 5(b)). The proximal end of the collar 64a is open. The collar 64a forms part of the clutch mechanism C. The sun gear 64b is formed in the middle portion of the shaft 64, more specifically, in a portion between the collar 64a and the ball bearing 68.

One of the planetary gears 65 is rotatably supported at the middle portion of each coupler pin 63. The planetary gears 65 are engaged with the sun gear 64b and with the tooth ring 37.

The clutch mechanism C will now be described with reference to FIGS. 5(a) to 7(b).

The clutch mechanism C transmits rotational force from the motor rotary shaft 40 to the sun gear shaft 64. The clutch mechanism C also permits sun gear shaft 64 to rotate without transmitting rotational force from the sun gear shaft 64 to the motor rotary shaft 40.

Figure 5B:
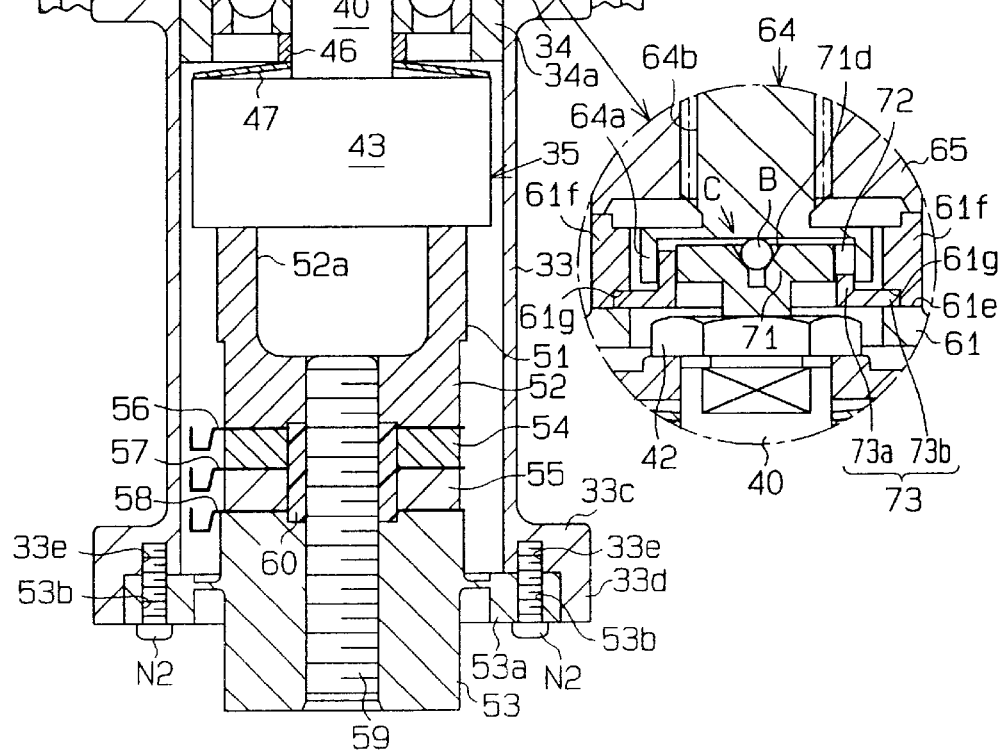

Specifically, the clutch mechanism C includes the collar 64a, a clutch shaft 71, three rolling bodies (only one is shown in FIGS. 5(a) and 5(b)), and a rotational limiting member, a retainer. In this embodiment, the rolling bodies are rollers 72, the rotational limiting member is a cylindrical roller holder 73, and the retainer includes the first supporting member 61 and the engaging member 61f.

Figure 6A:
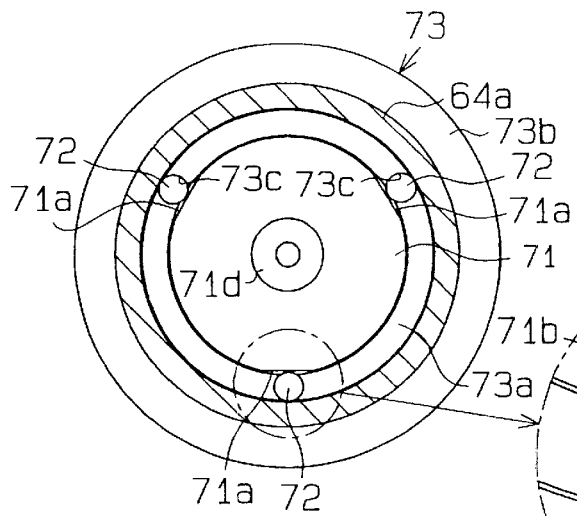
FIG. 6(*a*) is a schematic view showing the operation of the clutch mechanism of the rotation device shown in FIG. 5(*a*)
Figure 6B:
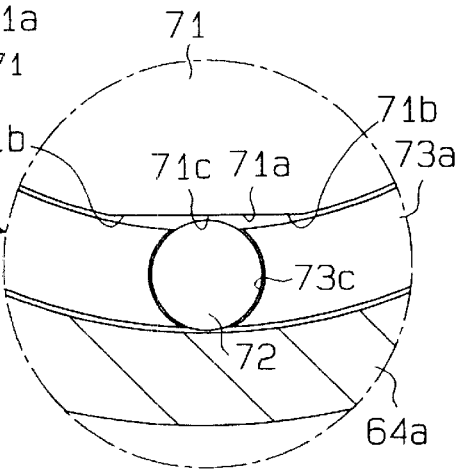

As shown in FIGS. 6(a), 6(b), the outer diameter of the distal end of the clutch shaft 71 (the upper end as viewed in FIG. 5(a)) is smaller than the inner diameter of the collar 64a. Three cut-off surfaces 71a are formed in the circumference of the clutch shaft 71. In this embodiment, the cut-off surfaces 71a are formed by linearly cutting parts of the circumference of the clutch shaft 71. The three cut-off surfaces 71a are arranged at equal angular intervals. The proximal portion (the middle and lower sections lower as viewed in FIGS. 5(a), 5(b)) is fixed to the distal end of the motor rotary shaft 40 (the middle and upper sections as viewed in FIGS. 5(a), 5(b)) to rotate integrally with the motor rotary shaft 40. The distal end of the clutch shaft 71 is located inside the collar 64a. Therefore, the distance between each cut-off surface 71a and the inner surface of the collar 64a varies in the circumferential direction. Also, the distance between each cut-off surface 71a and the inner surface of the collar 64a is shorter in the side sections 71b of the cut-off surface 71a (see FIG. 6(b)) and is longer in the center section 71c of the displacement of the cut-off surface 71a.

A holding recess 71d is formed in the center of the distal end of the clutch shaft 71 (the upper end as viewed in FIG. 5(a)). A ball B is received by the holding recess 71d. The ball B partly projects from the holding recess 71d and contacts the sun gear shaft 64. This permits the sun gear shaft 64 to smoothly rotate relative to the clutch shaft 71.

Each roller 72 is cylindrical and the diameter is shorter than the distance between the inner surface of the collar 64a and the center section 71c of each cut-off surface 71a as shown in FIGS. 6(a), 6(b). The diameter of each roller 72 is longer than the distance between the inner surface of the collar 64a and the side sections 71b of each cut-off surface 71a. Each roller 72 is located between one of the cut-off surfaces 71a and the inner surface of the collar 64a.

The roller holder 73 includes a cylindrical portion 73a and an engaging portion. In this embodiment, the engaged portion is an annular portion 73b, which extends radially outward from one end of the cylindrical portion 73a.

The outer diameter of the cylindrical portion 73a is slightly smaller than the inner diameter of the collar 64a. The inner diameter of the cylindrical portion 73a is slightly larger than the outer diameter of the distal end of the clutch shaft 71. The thickness of the cylindrical portion 73a is less than the diameter of each roller 72 (see FIG. 6(b)). Three receptacles 73c are formed in the other end (the middle and upper sections as viewed in FIG. 5(a)) of the cylindrical portion 73a. The receptacles 73c receive and hold the rollers 72 and are arranged in equal angular intervals. Each receptacle 73c has a pair of arcuate inner walls in the circumferential direction. The radius of curvature of the receptacles 73c is slightly greater than the radius of the rollers 72. Each receptacle 73c holds one of the rollers 72 and permits the roller 72 to slightly move in the axial direction. The distances among the three rollers 72 are constant. The roller holder 73 is arranged such that the cylindrical portion 73a is inserted into the collar 64a, and the annular portion 73b is located outside of the collar 64a and extends radially outward.

The first supporting member 61 and the engaging member 61f form the holding members and the retainer. The fist supporting member 61 and the engaging member 61f hold the annular portion 73b of the roller holder 73 by applying a predetermined pressure. That is, the first supporting member 61 and the engaging member 61f hold the annular portion 73b with the predetermined force and permits the annular portion 73b to rotate when a force greater than a predetermined value is applied. The predetermined value is significantly smaller than the rotational force of the motor rotary shaft 40 generated by the ultrasonic motor 35.

The controller (not shown) of the rotation device 31 applies high frequency voltage to the first to third electrode plate 56 to 58 in accordance with manipulation of the photocopier, thereby rotating the rotor 43.

After rotating the rotor 43 in one direction, the controller supplies high frequency voltage to rotate the rotor 43 in the opposite direction by a predetermined amount.

The operation of the above photocopier will now be described.

When high frequency voltage is applied to the first to third electrode plates 56 to 58 based on manipulation of the photocopier, the first and second piezoelectric elements 54, 54 are axially vibrated. Then, the slits (not shown) of the stator 51 covert the axial vibration into torsional vibration. Then, a compound vibration of the torsional vibration and the axial vibration is produced in the stator 51 (in the upper surface of the upper metal block 52). The rotor 43 is rotated by lifting force of the axial vibration component and thrust of the torsional vibration component. The motor rotary shaft 40 and the clutch shaft 71 are rotated with the rotor 43.

Figure 7A:
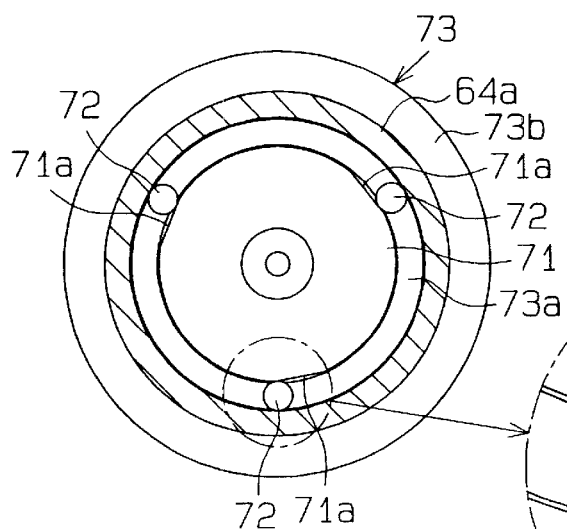
FIG. 7(*a*) is a schematic view showing the operation of the clutch mechanism of the rotation device shown in FIG. 5(*a*)
Figure 7B:
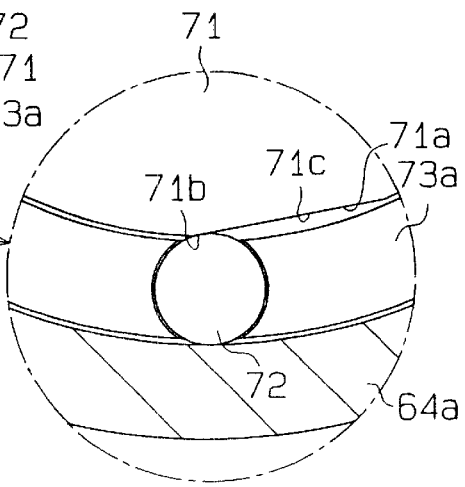

At this time, if the clutch shaft 71 is slightly rotated counterclockwise as shown in FIG. 7(a), each roller 72 is moved to one of the side sections 71b of the corresponding cut-off surface 71a. The roller 72 is thus tightly held between the side section 71b and the collar 64a. When the clutch shaft 71 is further rotated, each roller 72 receives force that further presses the roller 72 against the corresponding side section 71b, and the rotational force of the clutch shaft 71 is transmitted to the collar 64a through the rollers 72, which rotates the sun gear shaft 64. The roller holder 73 holding the rollers 72 is held by the first supporting member 61 and the engaging member 61f with a predetermined force. However, since the rotational force of the motor rotary shaft 40 based on the force of the ultrasonic motor 35 is significantly greater than the predetermined force, the roller holder 73 rotates integrally with the rollers 72.

Rotation of the sun gear 64b of the sun gear shaft 64 causes each planetary gear 65 to rotate about on its axis. Accordingly, the drum 32 rotates at a rate less than that of the rotation of the rotor 43. In this manner, the drum 32 is rotated based on manipulation of the photocopier. Since the ultrasonic motor 35 operates quietly and is highly responsive, the rotation device 31 operates quietly and is highly responsive.

The controller first rotates the rotor 43 and then provides the rotor 43 with high frequency voltage that rotates the rotor 43 in the opposite direction by a predetermined amount. Therefore, the rotor 43 is rotated in the opposite direction for a predetermined amount. The amount by which the rotor 43 is rotated in the opposite direction is determined such that each roller 72 is moved from the position in FIGS. 7(a), 7(b) at which the roller 72 is tightly held between the side section 71b of the cut-off surface 71a and the collar 64a, to the position in FIGS. 6(a), 6(b), at which the roller 72 is located at the center section 71c of the cut-off surface 71a. Therefore, after the rotation device 31 (the ultrasonic motor 35) is actuated, each roller 72 is positioned at a position corresponding to the center section 71c of the cutoff surface 71a.

When a sheet of paper is stuck in the photocopier and supply of high frequency voltage to the stator 51 is stopped, drum 32 is rotated manually to remove the stuck sheet. At this time, each planetary gear 65 rotates on its axis. This rotates the sun gear shaft 64 (the collar 64a). Since the roller holder 73 holding the rollers 72 is held by the first supporting member 61 and the engaging member 61f with the predetermined force, each roller 72 is not moved to the side sections 71b, or in the direction to engage with the cut-off surface 71a, even if the roller 72 slightly contacts the rotating collar 64a (even if the roller 72 chatters and contacts the collar 64a). Therefore, rotational force of the sun gear shaft 64 (the collar 64a) is not transmitted to the clutch shaft 71, and the clutch shaft 71 does not receive load. In this manner, the rotor 43 does not apply load against the manual rotation of the drum, that is, regardless of the self-holding force of the ultrasonic motor 35, the drum 32 can be manually rotated. This facilitates removal of the stuck sheet.

The characteristic advantages of the photocopier having the clutch mechanism C will now be described.

(1) The clutch mechanism C mechanically transmits rotational force from the motor rotary shaft 40 to the sun gear shaft 64. The clutch mechanism C also permits the sun gear shaft 64 to rotate without transmitting rotational force from the sun gear shaft 64 to the motor rotary shaft 40, or applying the load of the motor 40 to the sun gear shaft 64. Therefore, compared to a case where an electromagnetic clutch is used, the size and the costs of the apparatus are reduced.

(2) The clutch shaft 71 has the three cut-off surfaces 71a, which are arranged at equal angular intervals. Each roller 72 corresponds to one of the cut-off surfaces 71a. Therefore, when the motor rotary shaft 40 and the clutch shaft 71 are rotated, rotational force of the shaft 71 is transmitted to the collar 64a through three paths. The rotational force of the shaft 71 is thus transmitted to the collar 64a in a well-balanced manner, which improves durability of the members.

(3) The roller holder 73 has the annular portion 73b, which is held by the first supporting member 61 and the engaging member 61f with a predetermined pressure. Therefore, when the roller holder 73 is rotated, the roller holder 73 is always held with a simple structure.

(4) After the rotor 43 is rotated, the ultrasonic motor 35 is rotated in the opposite direction by a predetermined amount so that each roller 72 is moved to a position corresponding to the center section 71c of the corresponding cut-off surface 71a. Thus, when the drum 32 is manually rotated and the sun gear shaft 64 is rotated, the rollers 72 are prevented from being held between the sides 71b of the cut-off surfaces 71a and the collar 64a.

It should be apparent to those skilled in the art that the present invention may be embodied in many other specific forms without departing from the spirit or scope of the invention. Particularly, it should be understood that the invention may be embodied in the following forms.

In the illustrated embodiments, the cut-off surfaces 22a, 71a of the displacement shafts 22, 71 are formed flat by linearly cutting off parts of the shafts 22, 71. However, the shapes of the cut-off surfaces 22a 71a may be changed as long as the distances between the surfaces 22a, 71a and the cylindrical portion 21a, 64a change in the circumferential direction. For example, the cut-off surfaces 22a, 71a may be arcuate so that the distance from the cylindrical portion 21a, 64a changes gradually compared to the illustrated embodiments. In this case, the same advantages as the illustrated embodiments are obtained.

In the illustrated embodiments, the number of the cut-off surfaces 22a, 71a is three. However, the number may be four or more. Even if the number of the surfaces 22a, 71a are increased, the same advantages as the illustrated embodiments will be obtained. Also, the number of the surfaces 22a, 71a may be two. In this case, the advantages (1), (3), (4) of the first embodiment or the advantages (1), (3), (4) of the second embodiment will be obtained.

In the first embodiment, the number of the caliper 25 (the first and second shoes 25a, 25b) may be changed. In the second embodiment, the number of the engaging members 61f (retainers) may, be changed. If the number of the engaging members 61f is changed, the number of the recesses 61e must be changed accordingly. This modification has the same advantages as the illustrated embodiments.

In the illustrated embodiments, the roller holders 24, 73 have the annular portions 24d, 73b. The annular portion 24d is held by the first and second shoes 25a, 25b of the caliper 25 with a predetermined pressure. The annular portion 73b is held by the first supporting member 61 and the engaging member 61f with a predetermined pressure. The structure of the roller holders 24, 73 and the caliper 25 (the first and second shoes 25a, 25b or the first supporting member 61 and the engaging member 61f) may be changed.

For example, the roller holders 24, 73 may be engaged with the rollers 23, 72 to rotate integrally with the rollers 23, 72, and a separate rotation limiting member having an engaging portion may be fitted about the cylindrical portion 21a, 64a. The caliper 25 (the first and second shoes 25a, 25b or the first supporting member 61 and the engaging member 61f) may be replaced with another retainer that holds the engaging portion with a predetermined holding force and permits the engaged portion to be rotated when a force that is greater than the predetermined holding force is applied to the engaging portion. For example, the caliper 25 (the first and second shoes 25a, 25b) may be replaced with a retainer that is fixed to the gear housing 4 and holds the annular portion 24d with a predetermined holding force by pressing the annular portion 24d from a radially outward position. This modification has the advantages (1), (2), (4) of the first embodiment and the advantages (1), (2), (4) of the second embodiments.

In the illustrated embodiments, the rollers 23, 72 may be replaced with spherical bodies. This modification has the same advantages as the illustrated embodiments.

In the second embodiment, the motor is a standing-wave type ultrasonic motor 35. However, other types of motor, for example, a progressive wave type (flat disk type) ultrasonic motor, may be used as long as the motor has a clutch mechanism that permits the drum 32 to rotate without transmitting rotational force from the drum 32 to the motor. In this case, the shapes of the stator housing 33 and the rotor housing 34 must be changed accordingly.

In the second embodiment, the rotor 43 and the clutch mechanism C are coupled to the drum 32 by the reduction mechanism 36. However the rotor 43 and the clutch mechanism C may be directly coupled to the drum 32 without a reduction mechanism. In this case, the shape of the rotor 43 and the clutch mechanism C may be changed. This modification has the same advantages as the illustrated embodiments. Further, since the reduction mechanism is omitted, the modification reduces the number of the parts.

In the illustrated embodiments, the clutch mechanisms 5, C are used in the power-assisted door and the rotation device 31 of the photocopier. However, the clutch mechanisms 5, C may be used in other types of apparatuses.

Therefore, the present examples and embodiments are to be considered as illustrative and not restrictive and the invention is not to be limited to the details given herein, but may be modified within the scope and equivalence of the appended claims.

What is claimed is:

1. A clutch mechanism provided between a driving rotor and a driven rotor wherein the clutch mechanism selects from a state for transmitting rotational force of the driving rotor to the driven rotor and a state for discontinuing the transmission of rotational force generated from the driven rotor to the driving rotor, the clutch mechanism comprising:

a plurality of rolling bodies located between the driving rotor and the driven rotor; and a holder for holding the rolling bodies, wherein the holder permits the rolling bodies to roll, wherein the holder supports the rolling bodies such that the rolling bodies are switched between a transmitting position and a disconnecting position, wherein, when held at the transmitting position, the rolling bodies are engaged with both of the driving rotor and the driven rotor so that rotational force of the driving rotor is transmitted to the driven rotor, wherein, when held at the disconnecting position, the rolling bodies are disengaged from the driving rotor so that the transmission of rotational force from the driven rotor to the driving rotor is discontinued, and wherein, when external rotational force is applied to the driven rotor, the holder sets the rolling bodies to the disconnecting position;

a housing, wherein the driving rotor and the driven rotor are coaxially arranged in the housing around a rotation axis; and wherein the holder includes a cylindrical portion and an annular portion, wherein the cylindrical portion is located between the driving rotor and the driven rotor, and the annular portion is formed in the circumference of the cylindrical portion, wherein the rolling bodies are supported by the cylindrical portion, and are arranged at equal angular intervals, wherein the holder is supported by the housing with the annular portion, wherein the annular portion is located radially outward of the rolling bodies, and wherein the annular portion and the rolling bodies are located on an imaginary plane perpendicular to an axis of the driving rotor.

2. The clutch mechanism according to claim 1, wherein the driving rotor includes a clutch shaft located on the rotation axis, and the driven rotor includes a collar coaxial with the clutch shaft, wherein, when held at the transmitting position, the rolling bodies are engaged with both of the clutch shaft and the collar, and wherein, when held at the disconnecting position, the rolling bodies are disengaged from the clutch shaft.

3. The clutch mechanism according to claim 2, wherein a plurality of cut-off surfaces are formed in the circumference of the clutch shaft at equal angular intervals, wherein each rolling body engages with one of the cut-off surfaces, wherein, when held at the transmitting position, each rolling body engages with a side section of the corresponding out-off surface, and wherein, when held at the disconnecting position, each rolling body faces a center section of the corresponding cut-off surface.

4. The clutch mechanism according to claim 1, further comprising a supporting member for supporting the holder at the cylindrical portion, wherein, after the rolling bodies are moved to the transmitting position, the supporting member permits the holder to be rotated integrally with the clutch shaft by means of the rolling bodies, and wherein, when external rotational force is applied to the driven rotor, the supporting member permits the holder to be moved such that the rolling bodies are moved to the disconnecting position.

5. An actuator having a clutch mechanism, the clutch mechanism being provided between a driving rotor, which is driven by a motor, and a driven rotor, wherein the clutch mechanism selects from a state for transmitting rotational force of the driving rotor to the driven rotor and a state for discontinuing the transmission of rotational force generated from the driven rotor to the driving rotor, wherein the clutch mechanism comprises:

a plurality of rolling bodies located between the driving rotor and the driven rotor;

a holder for holding the rolling bodies, wherein the holder permits the rolling bodies to roll, wherein the holder supports the rolling bodies such that the rolling bodies are switched between a transmitting position and a disconnecting position, wherein, when held at the transmitting position, the rolling bodies are engaged with both of the driving rotor and the driven rotor so that rotational force of the driving rotor is transmitted to the driven rotor, wherein, when held at the disconnecting position, the rolling bodies are disengaged from the driving rotor so that the transmission of rotational force from the driven rotor to the driving rotor is discontinued, and wherein, when external rotational force is applied to the driven rotor, the holder sets the rolling bodies to the disconnecting position;

a housing wherein the driving motor and the driven rotor are coaxially arranged in the housing around a rotation axis; and wherein the holder includes a cylindrical portion and an annular portion, wherein the cylindrical portion is located between the driving rotor and the driven rotor, and the annular portion is formed in the circumference of the cylindrical portion, wherein the rolling bodies are supported by the cylindrical portion, and are arranged at equal angular intervals, wherein the holder is supported by the housing with the annular portion, wherein the annular portion is located radially outward of the rolling bodies and wherein the annular portion and the rolling bodies are located on an imaginary plane perpendicular to an axis of the driven rotor.

6. The actuator according to claim 5, wherein the driving rotor of the clutch mechanism includes a clutch shaft located on the rotation axis, and the driven rotor includes a collar coaxial with the clutch shaft, wherein, when held at the transmitting position, the rolling bodies are engaged with both of the clutch shaft and the collar, and wherein, when held at the disconnecting position, the rolling bodies are disengaged from the clutch shaft.

7. The actuator according to claim 6, wherein a plurality of cut-off surfaces are formed in the circumference of the clutch shaft at equal angular intervals, wherein each rolling body engages with one of the cut-off surfaces, wherein, when held at the transmitting position, each rolling body engages with a side section of the corresponding cut-off surface, and wherein, when held at the disconnecting position, each rolling body faces a center section of the corresponding cut-off surface.

8. The actuator according to claim 7, wherein, after rotating the driving rotor in one direction, the motor rotates the driving rotor in the opposite direction so that each rolling body is separated front the side section and faces the cut-off section of the corresponding cut-off surfaces.

9. The actuator according to claim 5, wherein the clutch mechanism further comprises a supporting member for supporting the holder at the cylindrical portion, wherein, after the rolling bodies are moved to the transmitting position, the supporting member permits the holder to be rotated integrally with the clutch shaft by means of the rolling bodies, and wherein, when external rotational force is applied to the driven rotor, the supporting member permits the holder to be moved such that the rolling bodies are moved to the disconnecting position.

10. The actuator according to claim 5, wherein the actuator is used for assisting opening and closing motions of a vehicle door.

11. The actuator according to claim 5, wherein the motor is an ultrasonic motor.

12. The actuator according to claim 5, wherein the actuator is applied to a device for rotating a drum of a photocopier.

13. A clutch mechanism for transmitting rotational force of a driving rotor to a driven rotor, which is coaxial with the driving rotor, wherein the clutch mechanism permits the driven rotor to rotate without transmitting rotational force generated from the driven rotor to the driving rotor, the clutch mechanism comprising:

a substantially cylindrical collar, wherein the collar rotates integrally with the driven rotor;

a clutch shaft, which is located inside of the collar and rotates integrally with the driving rotor, wherein a cut-off surface is formed in the circumference of the clutch shaft such that the distance between the cut-off surface and the inner surface of the collar varies;

a rolling body located between the inner surface of the collar and the cut-off surface, wherein the diameter of the rolling body is loss than the distance between the inner surface of the collar and a center section of the cut-off surface and is longer than the distance between the inner surface of the collar and a side section of the cut-off surface;

a rotation limiting member, which engages with the rolling body in a rotation direction about the axis of the driving rotor and rotates integrally with the rolling body, wherein the rotation limiting member has an engaged portion located radially outside of the collar, wherein the rotation limiting member is located radially outside of the rolling body, and wherein the rotation limiting member and the rolling body are located on an imaginary plane perpendicular to an axis of the driving rotor; and a friction creating portion, which holds the engaged portion with a holding force of a predetermined value, and wherein the friction creating portion permits the engaged portion to be rotated by a rotational force that is greater than the predetermined value.

14. The clutch mechanism according to claim 13, wherein the cut-off surface is one of more than three cut-off surfaces, which are arranged at equal angular intervals in the circumferential surface of the clutch shaft, and wherein the rolling body is one of a plurality of rolling bodies, each of which corresponds to one of the cut-off surfaces.

15. The clutch mechanism according to claim 13, wherein the engaged portion is an annular disk, the outer diameter of which is greater than the outer diameter of the collar, and wherein the friction creating portion has a holding member, which holds the disk with a predetermined value.

* * * * *